US011236539B2

(12) United States Patent
Yogo (10) Patent No.: US 11,236,539 B2
(45) Date of Patent: *Feb. 1, 2022

(54) DOOR TRIM ASSEMBLY (71) Applicant: TS TECH CO., LTD., Saitama (JP)

(72) Inventor: Hiroshi Yogo, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,853

(22) Filed: Jun. 25, 2020

(65) Prior Publication Data

US 2020/0325721 A1 Oct. 15, 2020

Related U.S. Application Data (62) Division of application No. 15/922,990, filed on Mar. 16, 2018, now Pat. No. 10,731,399.

(30) Foreign Application Priority Data

Mar. 17, 2017 (JP) .................................. 2017-052333

(51) Int. Cl.
*B60J 5/00* (2006.01)
*E05F 15/73* (2015.01)
(Continued)

(52) U.S. Cl.
CPC .................. *E05F 15/73* (2015.01); *B60J 1/17* (2013.01); *B60J 3/04* (2013.01); *B60R 13/0243* (2013.01);
(Continued)

(58) Field of Classification Search
CPC ....... E05F 15/73; E05F 15/689; E05F 15/695; E05F 1/77; E06B 9/24; E06B 2009/2464;
(Continued)

(56) References Cited

U.S. PATENT DOCUMENTS 5,760,554 A * 6/1998 Bustamante ........... H03K 17/96
318/280
6,157,372 A * 12/2000 Blackburn .......... G06F 3/04883
345/157
(Continued)

FOREIGN PATENT DOCUMENTS

CN 106382072 2/2017
DE 102014201098 7/2015
(Continued)

OTHER PUBLICATIONS

Chinese Office Action for CN201810219734.7 dated Jan. 6, 2021, 13 pages.
(Continued)

*Primary Examiner* — Jerry E Redman
(74) *Attorney, Agent, or Firm* — Dority & Manning, P.A.

(57) ABSTRACT

In a door trim assembly for a vehicle door having an opening fitted with a vertically moveable window pane and a drive unit for driving the window pane for selectively closing the opening, the door trim assembly includes: a door trim main body configured to be attached to an inboard side part of the vehicle door under the opening; at least one transmitter provided in an upper part of the door trim main body; at least one receiver provided in an upper part of the door trim main body and configured to receive a signal emitted from the transmitter and reflected by an object positioned near the window pane; and a control unit connected to the receiver to compute a position of the object according to the signal received by the receiver and control the drive unit according to the computed position of the object.

6 Claims, 5 Drawing Sheets

(51) Int. Cl.
  *E06B 9/24*    (2006.01)
  *B60R 13/02*   (2006.01)
  *B60J 3/04*    (2006.01)
  *B60J 1/17*    (2006.01)
  *E05F 15/689*  (2015.01)
  *E05F 15/695*  (2015.01)

(52) U.S. Cl.
  CPC .............. *E05F 15/689* (2015.01); *E06B 9/24* (2013.01); *B60R 2013/0287* (2013.01); *E05F 15/695* (2015.01); *E05F 2015/765* (2015.01); *E05Y 2201/644* (2013.01); *E05Y 2400/44* (2013.01); *E05Y 2400/45* (2013.01); *E05Y 2400/852* (2013.01); *E05Y 2400/86* (2013.01); *E05Y 2900/55* (2013.01); *E06B 2009/2464* (2013.01)

(58) Field of Classification Search
  CPC .......... B60R 13/0243; B60J 3/04; B60J 1/17; E05Y 2400/86; E05Y 2400/852; E05Y 2400/45; G06F 3/044
  USPC ...................................... 296/146.7
  See application file for complete search history.

(56) References Cited

U.S. PATENT DOCUMENTS

| | | | |
|---|---|---|---|
| 6,528,900 B1 | 3/2003 | Serizawa et al. | |
| 6,701,673 B1* | 3/2004 | Kessler | F16P 3/12 49/28 |
| 8,615,927 B2* | 12/2013 | Ezzat | G01V 15/00 49/26 |
| 9,255,435 B2* | 2/2016 | Weidenbacher | E05F 15/695 |
| 9,582,046 B2* | 2/2017 | Bhowmik | E05D 11/1078 |
| 10,006,239 B2* | 6/2018 | Disley | B60J 1/17 |
| 10,025,431 B2* | 7/2018 | Li | G06F 3/0416 |
| 10,066,737 B2* | 9/2018 | Baek | F16H 63/42 |
| 10,073,427 B2 | 9/2018 | Hirota et al. | |
| 10,308,167 B2* | 6/2019 | Caron | B60Q 1/503 |
| 10,323,451 B2 | 6/2019 | Ikeda et al. | |
| 10,450,788 B2* | 10/2019 | Ichinose | E05F 15/40 |
| 10,493,826 B2* | 12/2019 | Schwarz | E05F 15/689 |
| 10,682,952 B2* | 6/2020 | Scott | B60Q 3/54 |
| 10,731,399 B2* | 8/2020 | Yogo | E05F 15/73 |
| 10,763,053 B2* | 9/2020 | Kosugi | H01H 13/52 |
| 2001/0052715 A1* | 12/2001 | McAndrew | B60K 37/06 296/37.13 |
| 2008/0302014 A1* | 12/2008 | Szczerba | B60K 35/00 49/31 |
| 2010/0007463 A1* | 1/2010 | Dingman | B60Q 1/2669 340/5.72 |
| 2013/0090807 A1* | 4/2013 | Kojima | G06F 17/00 701/36 |
| 2013/0187889 A1* | 7/2013 | Pandher | G06F 3/044 345/174 |
| 2015/0019083 A1* | 1/2015 | Kalliomaki | H03K 17/955 701/49 |
| 2015/0372480 A1* | 12/2015 | Nagahama | E05F 15/659 49/26 |
| 2017/0126228 A1* | 5/2017 | Gerken | H03K 17/9622 |
| 2017/0147106 A1* | 5/2017 | Kwon | B60K 37/06 |
| 2018/0044964 A1* | 2/2018 | Ikeda | B60J 1/00 |
| 2018/0058127 A1* | 3/2018 | Ikeda | E05F 15/689 |
| 2018/0100342 A1* | 4/2018 | Ikeda | E05F 15/73 |
| 2018/0266164 A1* | 9/2018 | Yogo | E06B 9/24 |
| 2019/0077340 A1* | 3/2019 | Caravano | B60R 13/0212 |
| 2019/0213931 A1* | 7/2019 | Brubaker | G09F 21/048 |

FOREIGN PATENT DOCUMENTS

| | | |
|---|---|---|
| EP | 0617186 | 11/1998 |
| JP | H09319501 | 12/1997 |
| JP | 2009018655 | 1/2009 |
| JP | 2015034459 | 2/2015 |
| JP | 2017052490 | 3/2017 |

OTHER PUBLICATIONS

Japanese Office Action for JP2017052333 dated Dec. 18, 2020, 8 pages.

* cited by examiner

Fig.3 open close

Fig.5

DOOR TRIM ASSEMBLY

CROSS REFERENCE TO RELATED APPLICATIONS

The present application is a divisional of U.S. patent application Ser. No. 15/922,990 filed on Mar. 16, 2018 (now U.S. Pat. No. 10,731,399, issued on Aug. 4, 2020), which claims priority to Japanese Patent Application No. 2017-052333 having a filing date of Mar. 17, 2017, the disclosures of which are hereby incorporated by reference herein in their entirety for all purposes.

TECHNICAL FIELD

The present invention relates to a door trim assembly configured to be attached to an inner side of a vehicle door and fitted with an improved command input device for a vehicle window.

BACKGROUND ART

A known window regulator system determines a target window pane position by detecting the position of a user's fingertip, and drives a window regulator so as to move the window pane until the upper edge of the window pane coincides with the position of the user's fingertip. See JP2015-34459A. The position of the fingertip can be determined by using an optical detection device including a plurality of light emitters arranged along a side edge of a window frame and a plurality of light receivers arranged along the opposite side edge of the window frame.

According to this prior art, the light emitters and the light receivers are attached to the corresponding parts of the window frame. However, the window frame is formed by combining a number of different members such as an inner molding, window pane run channels, and so on, and some difficulty arises in positioning the light emitters and the light receivers in an adequately accurate manner. Also, some complications may arise in the assembly work.

SUMMARY OF THE INVENTION

In view of such a problem of the prior art, a primary object of the present invention is to provide a door trim assembly that allows the sensors for detecting the position of a fingertip for controlling a window regulator to be arranged in a simple manner.

To achieve such an object, the present invention provides a door trim assembly (1) for a vehicle door (2) having an opening fitted with a vertically moveable window pane (7) and a drive unit (20) for driving the window pane for selectively closing the opening, comprising: a door trim main body (5) configured to be attached to an inboard side part of the vehicle door under the opening; at least one transmitter (10a, 11a) provided in an upper part of the door trim main body; at least one receiver (10b, 11b) provided in an upper part of the door trim main body and configured to receive a signal emitted from the transmitter and reflected by an object positioned near the window pane; and a control unit (20) connected to the receiver to compute a position of the object according to the signal received by the receiver and control the drive unit according to the computed position of the object.

Since the transmitter and the receiver are provided in the door trim main body, the mounting of the transmitter and the receiver on the door is facilitated.

Preferably, the transmitter and the receiver are provided on an upper edge of the door trim main body.

Thereby, the detection area for the transmitter and the receiver for detecting the object can be limited to an area adjoining the inboard side of the window panel, and therefore, the user's command can be detected correctly, and any erroneous operation of the drive unit can be avoided.

According to a particularly preferred embodiment of the present invention, the at least one transmitter includes a pair of transmitters that are arranged in a front part and a rear part of an upper edge of the door trim main body, and the at least one receiver includes a pair of receivers positioned adjacent to the respective transmitters.

Because each transmitter and the associated receiver can be formed as a single sensor unit, the mounting of the transmitters and the receivers on the door trim main body can be facilitated. Also, the position of the object such as the fingertip of the user can be detected by using trigonometry irrespective of the fore and aft position of the object so that the detection area for the sensor units can be maximized.

Preferably, the control unit is provided with a storage unit storing a prescribed pattern of movement of the object, and is configured to control the drive unit depending on a relation between a computed movement of the object and the stored pattern of movement.

Thereby, the control unit can identify the position of the object in a reliable manner so that an erroneous operation of the drive unit can be minimized.

Preferably, the control unit is configured to learn the prescribed pattern of movement by a teaching process.

Thereby, an erroneous operation of the drive unit can be minimized even further.

Preferably, the signal transmitted from the transmitter consists of radiation energy.

The radiation energy may consist of radio wave, laser, infrared light, etc. and relative inexpensive sensors may be used.

Alternatively, the signal transmitted from the transmitter consists of electric field.

The principle of detecting the object may be based on that of per se known proximity sensors based on the detection of capacitive changes. In this case, the transmitter/receiver may consist of an electrode formed by a simple strip of electroconductive sheet. Thereby the cost can be minimized, and the electrode can be mounted on the door trim main body in a highly simple and unobtrusive manner.

According to a preferred embodiment of the present invention, the control unit is configured to raise the window pane when an upward movement of the object is detected, and lower the window pane when a downward movement of the object is detected.

Thus, the user is enabled to command the drive unit in an intuitive manner.

Preferably, the control unit is provided on an outboard side of the door trim main body.

Thereby, the control unit may be positioned relatively near the transmitter and the receiver in a favorably concealed manner.

According to another embodiment of the present invention, the window pane is configured to change transmissivity and/or tint according to an electric voltage supplied thereto, and the control unit is configured to control the electric voltage supplied to the window pane according to the computed position of the object.

Thus, the control unit may change the transmissivity and/or tint of the window pane in a simple manner.

PREFERRED EMBODIMENT(S)

A first embodiment of the present invention is described in the following with reference to FIGS. 1 to 4. In the following description, the directions are based on the viewpoint of a vehicle occupant seated next to the door trim assembly.

Figure 1:
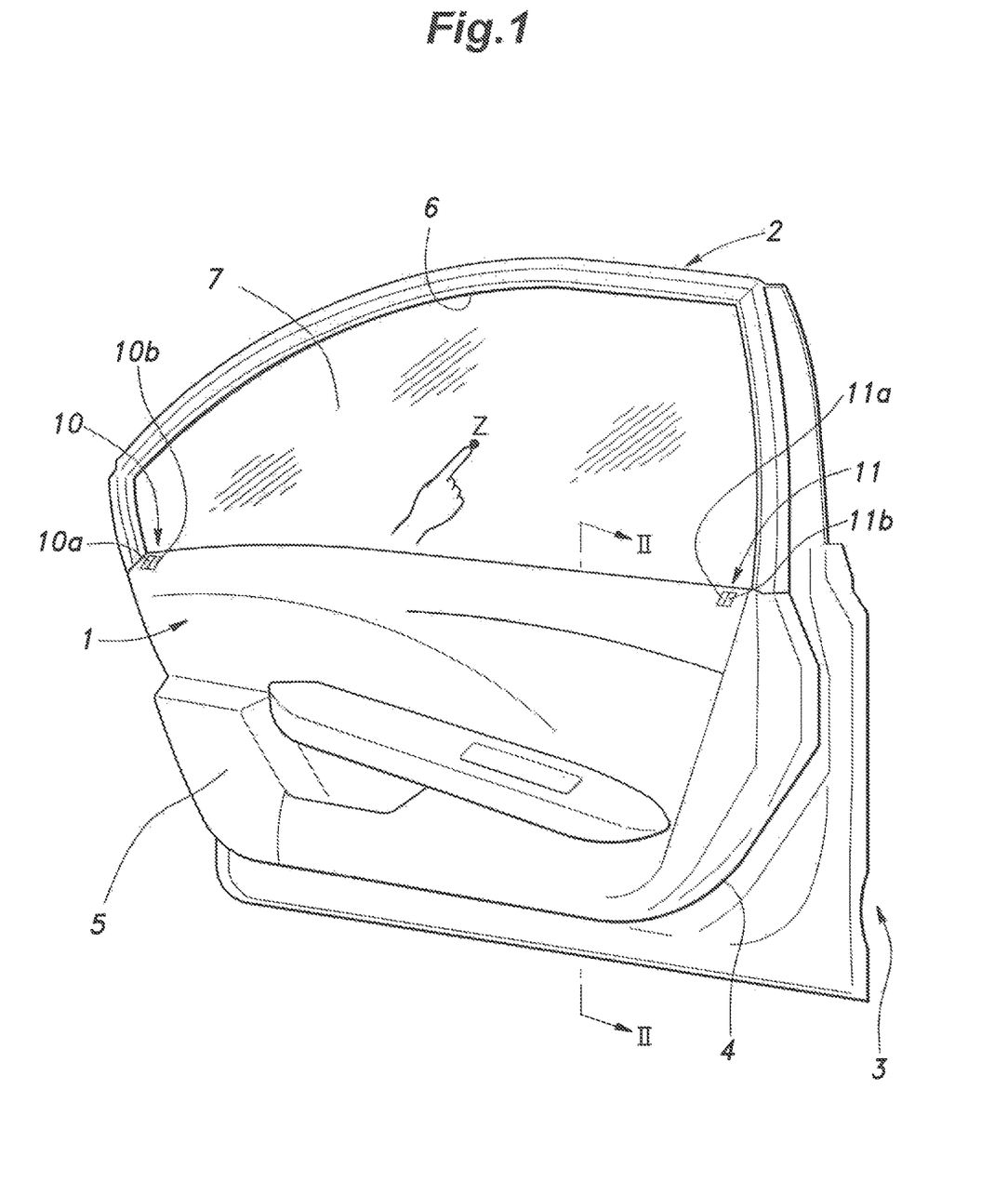
FIG. 1 is a perspective view of a vehicle door fitted with a door trim assembly according to the present invention.
Figure 2:
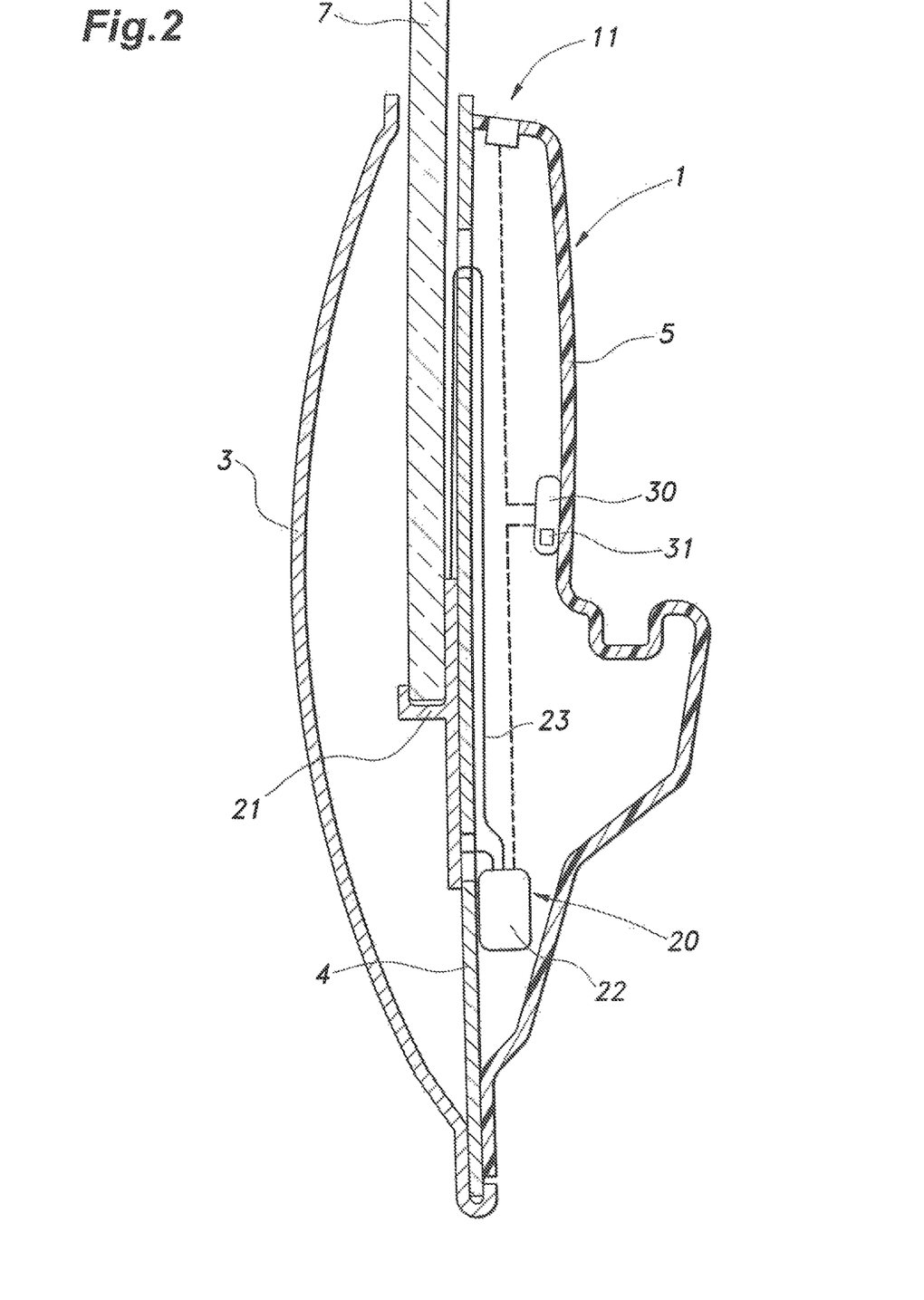
FIG. 2 is a sectional view taken along line II-II of FIG. 1.

Referring to FIG. 1 and FIG. 2, a door trim assembly 1 according to the first embodiment of the present invention is provided on a right front door 2 of a vehicle which is situated next to the driver's seat. The door 2 is provided with an outer panel 3 made of sheet steel and provided on the outboard side of the door 2 and an inner panel 4 also made of sheet steel and provided on the inboard side of the door 2. An upper part of the outer panel 3 and the inner panel 4 jointly define a rectangular opening 6, and a window pane 7 consisting of glazing is placed in the opening 6 in a vertically moveable manner. The door trim assembly 1 includes a door trim main body 5 that covers the inboard side of a lower part of the inner panel 4, and the upper edge of the door trim main body 5 extends along the lower edge of the opening 6.

As shown in FIG. 2 which illustrates the interior of the door 2 in a highly simplified manner, the window pane 7 is disposed between the outer panel 3 and the inner panel 4. The lower end of the window pane 7 is supported by a pane retainer 21 which is in turn vertically slidably supported by the inner panel 4. The window pane 7 is guided for a vertical movement by a window rail not shown in the drawings in a per se known manner. A window regulator (drive unit) 20 incorporated with an electric motor 22 is attached to the inboard side of the inner panel 4, and a cable 23 extends from the window regulator 20. The cable 23 is passed around a pulley (not shown in the drawings) provided inside the window regulator 20, and two ends of the cable 23 are attached to the pane retainer 21 so that the pane retainer 21 along with the window pane 7 can be raised and lowered as required by activating the window regulator 20. The window regulator 20 is normally controlled manually in a per se known manner. In the illustrated embodiment, the window regulator 20 is also connected to a control unit 30 provided with a storage unit 31 consisting of rewritable memory such as flash memory, and the output signals of the sensor units 10 and 11 are connected to the control unit 30 so that the window pane 7 may be raised and lowered simply by moving a finger vertically along the inner side of the window pane 7 as will be described hereinafter. In the illustrated embodiment, the control unit 30 is attached to the inner side (outboard side) of the door trim main body 5, and the sensor units 10 and 11 are mounted in the upper edge of the door trim main body 5. The upper edge of the door trim main body 5 consists of a shelf-like wall extending substantially horizontally (with a slight slant in the inboard direction).

Sensor units 10 and 11 are provided in a front and a rear end part of an upper edge part of the door trim main body 5, respectively. Each sensor unit 10, 11 includes a transmitter 10a, 11a and a receiver 10b, 11b for detecting a signal emitted from the transmitter 10a, 11a of the same sensor unit 10, 11. The transmitters 10a and 11a are each provided with a directivity so that the emitted light signal travels along the inner surface of the window pane 7. Such a directivity may be accomplished by using a suitably shaped slit and/or other optical devices. In the illustrated embodiment, each transmitter 10a emits a sheet of light extending along the inner surface of the window pane 7.

If desired, the receivers 10b and 11b may also be configured to detect only the signals transmitted from the transmitters 10a and 11a of the other sensor units 10 and 11, respectively.

In the present embodiment, the sensor units 10 and 11 consist of per se known infrared distance measuring sensors each including an infrared LED and a pair of CMOS image sensors. The image of the object is captured by the two CMOS image sensors at slightly different positions owing to parallax. Based on this positional difference, the distance between the sensor unit and the object can be determined.

Each sensor unit 10, 11 allows the distance between the object and the sensor unit 10, 11 to be detected, and the control unit 30 computes the vertical position of the object by using trigonometry.

When other types of range finders which are based on measurement of the time required to travel from the transmitter, and to be reflected back to the receiver are used as the sensor unit 10 and 11, it may be necessary to prevent crosstalk between the two sensor units 10 and 11. In such a case, the receivers 10b and 11b may be configured to detect only the signals transmitted from the transmitters 10a and 11a of the same sensor units 10 and 11, respectively. For instance, the transmitters 10a and 11a may transmit light in mutually exclusive timing. Alternatively, the transmitters 10a and 11a may emit light modulated in mutually different ways so that the light signal from the transmitters 10a and 11a may be individually detected. At any event, the light emitted from the transmitter 10a is detected by the receiver 10b, and the light emitted from the transmitter 11a is detected by the receiver 11b.

Figure 3:
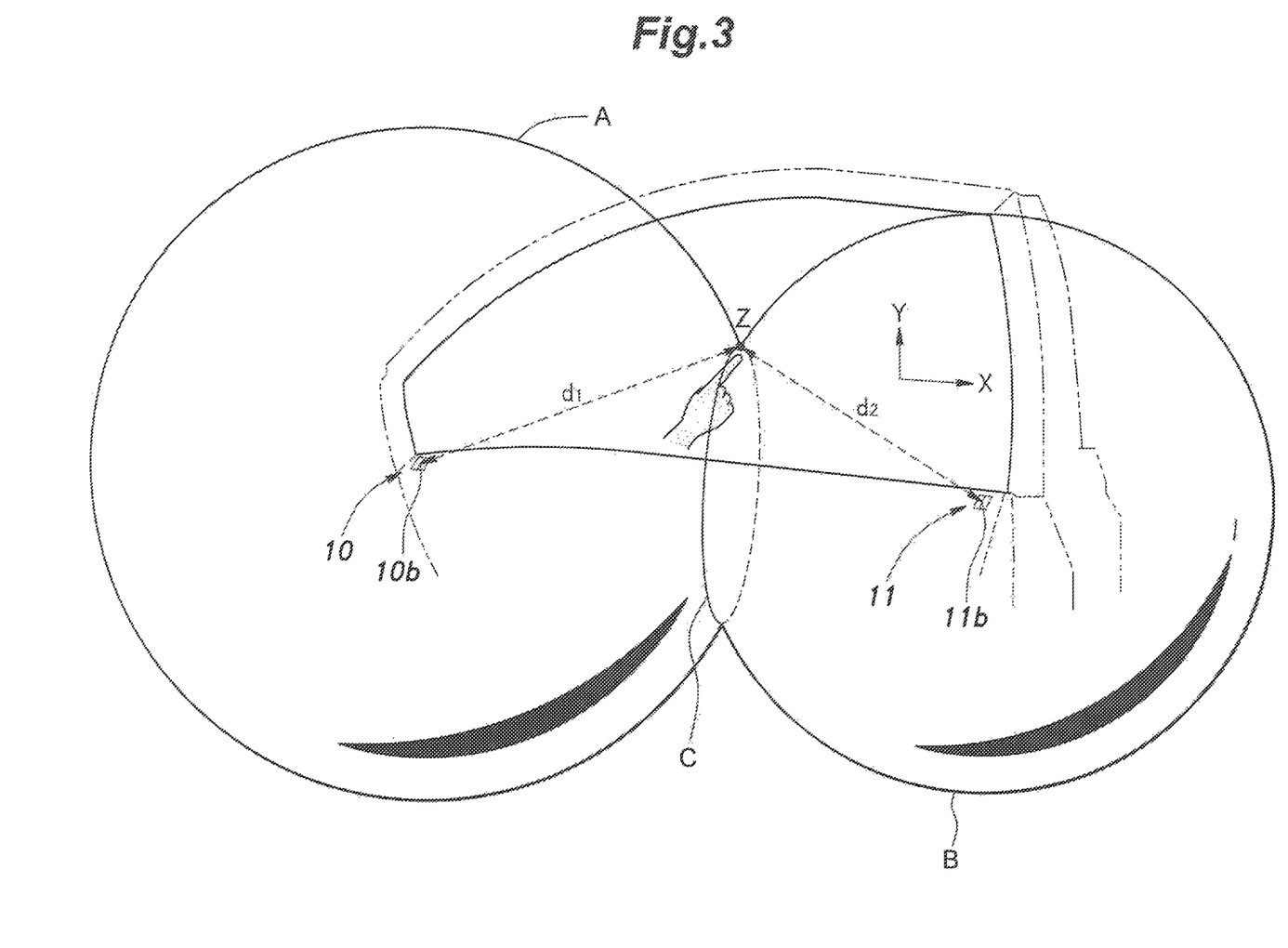
FIG. 3 is a schematic diagram illustrating the principle of computing a position of a fingertip of a vehicle occupant.

FIG. 3 shows the principle of the process for computing the position of an object (a finger). When the object is at point Z, the sensor units 10 and 11 detect the object as being at a distance d1 and d2, respectively, from the respective sensor units 10 and 11. The loci of the points at the distances of d1 and d2 from the sensor units 10 and 11 are, respectively, given as spheres A and B centered around the positions of the respective sensor units 10 and 11. The intersection of these spheres A and B is given by a circle C. Therefore, the position of the object can be determined as being on a point on this circle C. Because the light emitted from the transmitters 10a and 11a extends along the inboard surface of the window pane 7, the vertical height of the object can be determined as the height of point Z from the line extending between the two sensor units 10 and 11.

Figure 4A:
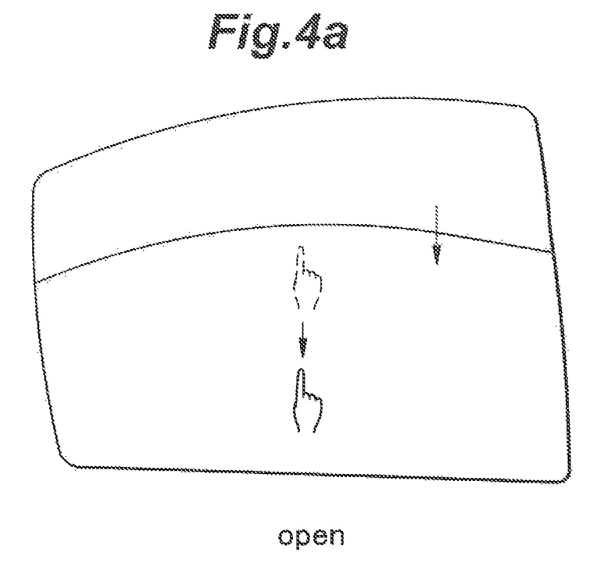
FIG. 4a is a schematic view of an opening operation performed by a vehicle occupant.

Thus, when the window pane 7 is desired to be opened or lowered, as shown in FIG. 4a, the user places his finger next to the inboard side of the window pane 7, and moves his finger downward. As a result, the control unit 30 causes the window pane 7 to be lowered via the window regulator 20. The user may repeat the down strokes of his finger alternating with slow upward strokes or upward strokes along a more inboard path until the desired height of the window pane 7 is reached.

Figure 4B:
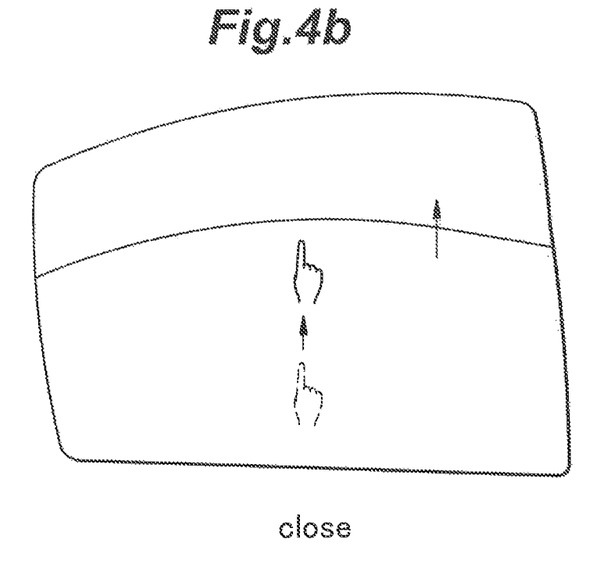
FIG. 4b is a schematic view of a closing operation performed by a vehicle occupant.

When the window pane 7 is desired to be closed or raised, as shown in FIG. 4*b*, the user places his finger next to the inboard side of the window pane 7, and moves his finger upward. As a result, the control unit 30 causes the window pane 7 to be raised via the window regulator 20. The user may repeat the upward strokes of his finger alternating with slow downward strokes or downward strokes along a more inboard path until the desired height of the window pane 7 is reached.

Thus, according to the illustrated embodiment, the window pane 7 can be opened and closed simply by moving one's fingertip along the window pane 7 in an intuitive manner.

By positioning the sensor units 10 and 11 in an upper edge of the door trim main body 5, typically consisting of a relatively horizontal shoulder surface, the user's fingertip can be detected in a reliable manner. Furthermore, the sensor units 10 and 11 may be placed in a highly unobtrusive manner. In particular, the entire assembly can be installed in the shelf-like wall of the door trim main body 5 in an uppermost part thereof. Therefore, the external appearance of the inner upholstery of the passenger compartment is not impaired in any way.

The control unit 30 may also be configured such that the speed of the vertical movement of the window pane 7 may be varied depending on the speed of the downward or upward stroke or strokes of the user's fingertip.

The sensor units 10 and 11 may also use other forms of sensors. For instance, ultrasonic sensors, laser sensors, and radars (radio wave transceivers) may also be used for the present invention.

The movement of a finger detected by the sensor units 10 and 11 may not be limited to simple upward strokes of a finger. For instance, the control unit 30 may be configured to store a pattern of finger movements as a teaching process so that a particular mode of finger movement may be stored in the storage unit 31. For instance, the user may teach the control unit 30 slow repeated strokes of finger movement. Alternatively, the user may teach the control unit 30 rapid repeated strokes of finger movement. Thereby, the control unit 30 may correctly detect the intension of the user to close or open the window pane 7 by comparing the detected movement of the finger with the stored movement pattern without being erroneously activated by movement of an object next to the window pane 7 which has nothing to do with the intension to open or close the window pane 7.

The control unit 30 may also be provided with a perpetual learning function. The control unit 30 stores the movement of the user's fingertip every time a command to open or close the window pane 7 is received, and accumulates the statistical data on the movement of the user's fingertip. When a new command by the user's fingertip is received, the control unit 30 compares the data on the new command with the accumulated statistical data, and determines if the new command is genuine or not depending on the result of the comparison between the detected movement of the object with the data stored in the storage unit 31 of the control unit 30. Thereby, the control unit 30 is prevented from inadvertently activating the window regulator 20 in an even more effective manner.

The control unit 30 may control, in addition to or instead of the window regulator 20, a transmissivity and/or a tint of the window pane 7 which is configured to change the transmissivity and/or the tint thereof according to an electric voltage applied thereto. In such a case, the command may be given by a motion of a fingertip other than vertical strokes. For instance, a lateral stroke or oblique stroke may be used as a command.

In the first embodiment, two sensor units 10 and 11 were used. However, a single sensor placed in a central or otherwise convenient location on an upper edge of the door trim main body 5 may be used for detecting the vertical position of an object such as a user's fingertip.

As another modification of the first embodiment, it is possible to use a single transmitter and a pair of receivers. The two receivers detect infrared light or any other radiation energy emitted from the transmitter and reflected by the object. The control unit receives output signals from the two receivers, and can compute the position of the object in a similar way by using trigonometry as in the first embodiment. Further, three or more sensors may be used so that robustness of the control process may be improved.

Figure 5:
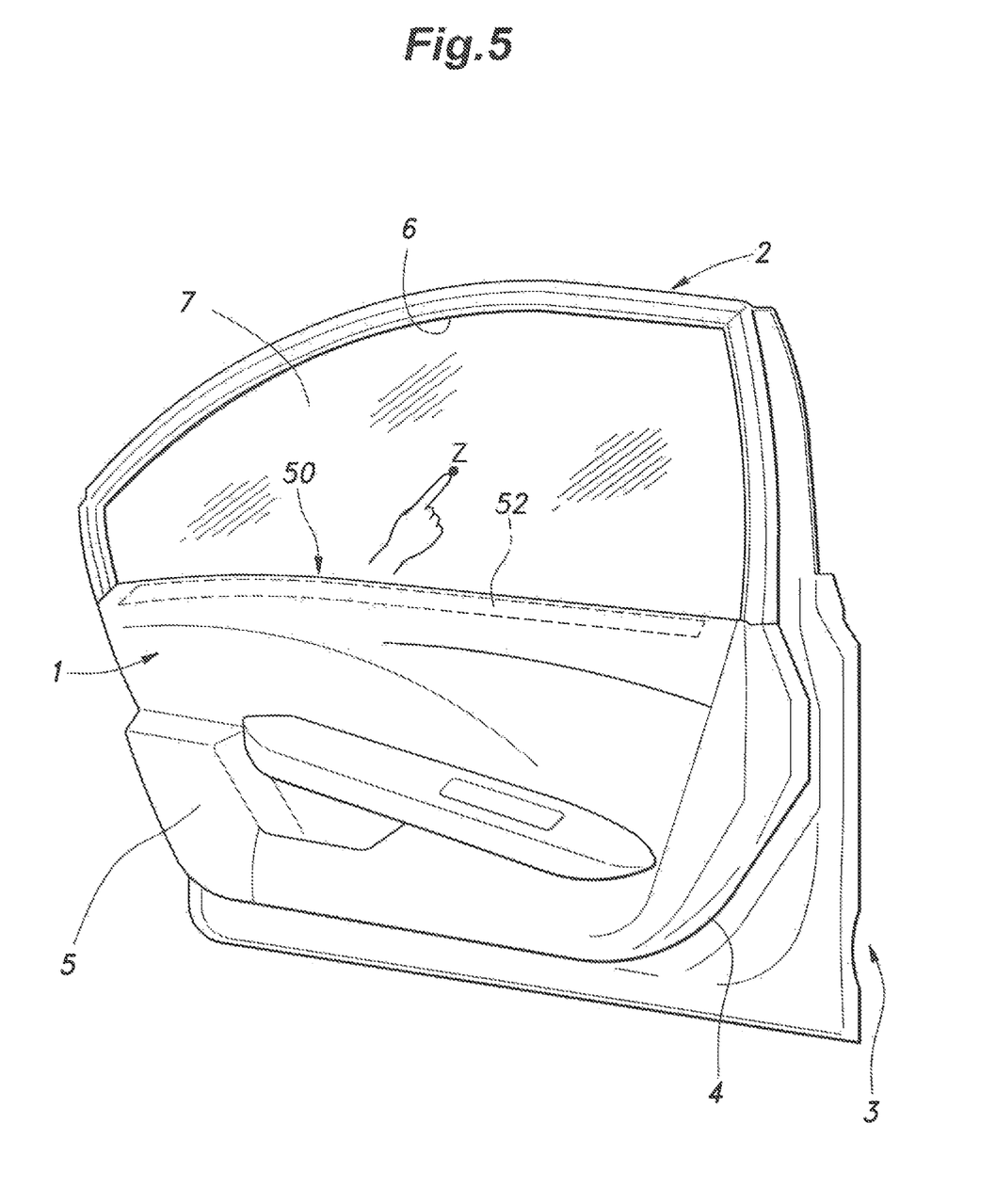
FIG. 5 is a view similar to FIG. 1 showing an alternate embodiment of the present invention.

FIG. 5 shows a second embodiment of the present invention. This embodiment includes a capacitive proximity sensor 50. The proximity sensor 50 includes an electrode 52 consisting of a strip of electroconductive sheet attached to the lower surface of the upper edge or the shelf-like uppermost wall part of the door trim main body 5. This electrode 52 may extend substantially over the entire length of the door trim main body 5. However, the electrode 52 may be provided only in a central part or other part of the door trim main body 5.

The proximity sensor 50 is configured to detect the distance between the electrode 52 and an object such as a fingertip positioned above the electrode 52. The proximity sensor 50 is connected to the control unit 30 so that the control unit 30 is able to determine the vertical position of the object from the electrode 52 according to the signal supplied by the proximity sensor 50 to the control unit 30. Thus, the control unit 30 is enabled to control the window regulator 20 in a substantially similar manner as in the first embodiment.

Although the present invention has been described in terms of preferred embodiments thereof, it is obvious to a person skilled in the art that various alterations and modifications are possible without departing from the scope of the present invention.

The invention claimed is:

1. A trim assembly for a vehicle having a drive unit for driving a component of the vehicle, comprising:
   a trim main body configured to be attached to an inner side part of the vehicle;
   at least one transmitter provided in the trim main body;
   at least one receiver provided in the trim main body and configured to receive a signal emitted from the transmitter; and
   a control unit connected to the receiver and configured to control the drive unit, wherein the trim main body is a door trim panel attached to an inner side of a vehicle door having an opening fitted with a window pane and a driving unit for driving the window pane, and the door trim panel is configured to be attached to an inboard side part of the vehicle door, and the signal emitted from the transmitter consists of an electric field.

2. The trim assembly according to claim 1, wherein the transmitter and the receiver are provided on an upper edge of the trim main body.

3. The trim assembly according to claim 1, wherein the at least one transmitter includes a pair of transmitters that are arranged in a front part and a rear part of an upper edge of the door trim panel, and the at least one receiver includes a pair of receivers positioned adjacent to the respective transmitters.

4. The trim assembly according to claim 1, wherein the receiver is configured to receive the signal reflected by an object positioned near the door trim panel, and the control unit is provided with a storage unit storing a prescribed pattern of movement of the object and is configured to compute a position of the object according to the signal received by the receivers and control the drive unit depending on a relation between a computed movement of the object and the stored pattern of movement.

5. The trim assembly according to claim 4, wherein the control unit is configured to learn the prescribed pattern of movement by a teaching process.

6. The trim assembly according to claim 1, wherein the trim assembly comprises two receivers and the two receivers are separately provided in front and rear parts of the trim main body.

* * * * *